No. 623,705. Patented Apr. 25, 1899.
W. G. DAVIS.
DRAFT APPARATUS FOR VEHICLES.
(Application filed Jan. 24, 1899.)
(No Model.)
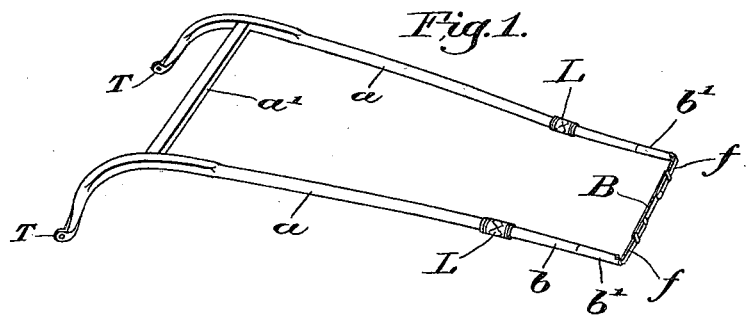
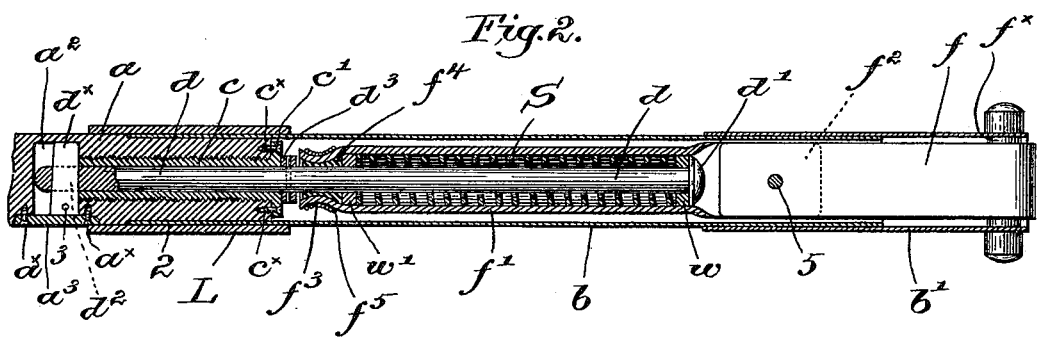
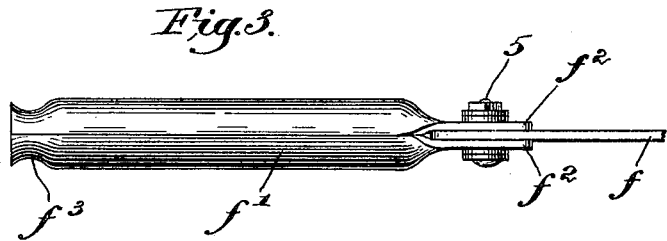
Witnesses.
Thomas J. Drummond.
Edward F. Allen.
Inventor.
Wilbur G. Davis.
by Crosby Gregory
attys.

UNITED STATES PATENT OFFICE.

WILBUR G. DAVIS, OF NEWTON, MASSACHUSETTS.

DRAFT APPARATUS FOR VEHICLES.

SPECIFICATION forming part of Letters Patent No. 623,705, dated April 25, 1899.

Application filed January 24, 1899. Serial No. 703,261. (No model.)

*To all whom it may concern:*

Be it known that I, WILBUR G. DAVIS, of Newton, county of Middlesex, State of Massachusetts, have invented an Improvement in Draft Apparatus for Vehicles, of which the following description, in connection with the accompanying drawings, is a specification, like letters and figures on the drawings representing like parts.

This invention has for its object the production of novel draft apparatus for vehicles, particularly adapted for single hitches, whereby the use of a whiffletree is entirely obviated, the flapping of traces prevented, the freedom of movement of the horse increased, and the whole appearance of the team greatly improved.

By my invention I am also enabled to bring the shafts closer to the body of the horse, thus decreasing the width between shafts, and the pull of the horse is transmitted to the vehicle through the shafts by almost entirely concealed draft members attached by yielding connections to the shafts themselves.

Various other features of my invention will be hereinafter described in the specification and particularly pointed out in the following claims.

Figure 1 is a perspective view of a pair of vehicle-shafts embodying one form of my novel draft apparatus, the outer ends of the draft members being shown as connected with the breast-strap. Fig. 2 is an enlarged longitudinal section of the leading end of a shaft, showing clearly the draft apparatus; and Fig. 3 is a top or plan view of the inner end of one of the draft members detached to show the tubular socket or end which loosely embraces the draft-spring.

Referring to Fig. 1, the body portions $a$ of the shafts, preferably made of hickory or other suitable tough, strong, and elastic wood or other material, are bent upward from the thill-couplings T and rigidly connected by a cross-bar $a'$, the shafts being straight or slightly curved from the cross-bar to their tips. At the outer end of the body portion of each shaft I apply thereto a tightly-fitting metallic tube $b$, and upon the outer end of the tube the hollow open-ended tip $b'$ is secured. As shown in Fig. 2, the tube or leading end $b$ is forced onto the end of the shaft-body $a$, as at 2, the latter being slightly reduced in diameter to receive the tube, and over the joint I force the tug-leather L, the usual slight taper of the shaft holding the leather firmly in place.

The outer end of each shaft-body is longitudinally bored to receive an externally-threaded sleeve-like anchor $c$, made of metal, and having a laterally-extended head $c'$, which abuts against the end of the body, screws $c^\times$, passed through the head into the body, preventing any possible rotation of the anchor and further holding it rigidly in place, the anchors being attached before the tubular ends $b$ are positioned. At the rear end of each anchor the shaft-body is transversely recessed, as at $a^2$, from the under side, the open end of the recess being closed by a cap $a^3$, let into the body and held in place by screws $a^\times$, the recess receiving a retaining or locking key, to be described. A spring-support, shown as a rod $d$, having a head $d'$ at its outer end, is inserted in the bore of the anchor $c$ and fits closely therein, the inner end of the rod projecting beyond the anchor into the recess $a^2$ and having a key-slot $d^2$, Fig. 2, to receive a steel key $d^\times$. This key is inserted through the open end of the recess $a^2$, and as the key is slightly wedge-shaped it serves to draw a collar $d^3$ on the rod $d$ tightly against the outer end of the anchor, the outer edge of the key bearing against the wall of the recess and the rear end of the anchor, so that the spring-support is firmly held in place. For convenience I make a hole 3 in the key, by which it can be readily withdrawn from the recess by means of a hook, nail, &c., when it is desired to detach the spring-support and thereby release the draft member, as will be apparent hereinafter.

A draft-spring S, preferably made quadrilateral in cross-section and of suitable strength, is loosely coiled around the forwardly-projecting end of the support $d$ between suitable washers $w\,w'$, the former abutting against the head $d'$ of the support, the coils of the spring being of greater internal diameter than the support, so as to avoid scraping over or touching it when compressed.

A draft member $f$, of leather or other suitable flexible material, is retained within the tubular portion of each shaft and extends at its outer end through the open tip of the shaft and passes around a suitable antifriction-bearing $f^\times$, of desired construction—such, for instance, as shown in my United States Patent No. 605,632, dated June 14, 1898—the free outer end of the draft members being detachably connected with a breast-strap B, Fig. 1. The inner end of each draft member is provided with a tubular portion $f'$, in the present instance made of leather rolled into cylindrical form and having ears $f^2$ to embrace the inner end of the draft member, to which it is attached by a suitable bolt 5, as shown in Figs. 2 and 3. The tubular portion $f'$ slips over and loosely embraces the draft-spring S, as clearly shown in Fig. 2, and the rear end of such portion is crimped, as at $f^3$, about a hard-rubber or other non-metallic collar $f^4$, mounted to slide upon the spring-support $a$, the exterior of the collar being conical and concaved to retain the crimped portion $f^3$ thereupon, waxed thread or wire $f^5$, Fig. 2, being tightly wrapped around the crimped portion to securely attach it to the collar $f^4$. The end of the crimped portion extends slightly beyond the end of the collar $f^4$, as will be seen by reference to Fig. 2, to abut against the metal collar $d^3$, fast on the spring-support $d$, thus preventing any rattling by reason of the two collars coming together.

From the foregoing description and the drawings it will be obvious that the draft-spring is held from movement at its outer end and at its inner end is attached to the draft member, so that tension exerted by the pull of the horse on said draft member will compress the spring more or less, and the pull will be transmitted through the spring and its support to the body portion of the shaft and thence to the vehicle.

The non-metallic socket or tube $f'$, embracing the spring, prevents any possible rattle, as contact of metal with metal is thereby prevented.

By referring to Fig. 1 it will be seen that the greater part of the draft members is concealed and that the yielding or draft springs between said draft members and the shafts are entirely concealed, so that the unsightly and disagreeable flapping of traces between the animal and the shafts is entirely done away with, and the shafts can be brought close to the sides of the animal, so that the line of pull is as near as possible to his body and transmitted in a direct line to the body portion of the shafts.

By eliminating the whiffletree there is nothing to catch the tail of the horse or of the reins, and the construction of the shafts is much simplified in this respect.

Should one of the draft-springs break or any part of the connection between the draft member and shaft-body become broken or deranged, the said parts may be removed by detaching the cover $a^3$ of the recess $a^2$, withdrawing the key $d^\times$, and then pulling out the draft member with the spring and spring-support. Before removing the draft member, as described, the tip $b'$ is detached or pulled off from the metallic tubular member $b$, as provided for in my patent herein referred to.

By subjecting the springs to compressive strain, as herein described, such strain reaches its limit when the coils engage each other, and thereafter any further pull on the draft members will have no tendency to subject the spring to improper strain.

Having fully described my invention, what I claim, and desire to secure by Letters Patent, is—

1. Vehicle-shafts having tubular portions open at their tips, flexible draft members within the tubular portions and extended through the open tips, a bearing for the draft member at or near the tip of each shaft, and yielding connections between the shafts and the draft members.

2. Vehicle-shafts having longitudinal bores in their straight portions and open at their tips, draft members permanently retained in the shafts and extended through the open tips, an antifriction-bearing for the draft member, at or near the tip of each shaft, and concealed yielding connections between the shafts and the inner ends of the draft members.

3. Vehicle-shafts comprising solid body portions and tubular leading ends, flexible draft members within the tubular portions and extended through the outer ends thereof and spring connections concealed within the shafts and attached to the inner ends of the draft members and the body portions of the shafts.

4. Vehicle-shafts provided with tubular metallic leading ends, independent draft members longitudinally movable within said leading ends and extended through the tips thereof, and spring connections between said draft members and the shafts and located within the tubular ends of the shafts.

5. Vehicle-shafts having solid body portions and tubular leading ends, sleeve-like anchors held in the body portions, a headed spring-support mounted in each anchor and extended into the leading end of the shaft, draft members within the leading ends of the shafts, and a spring interposed between the head of the support and the inner end of each draft member and attached to the latter.

6. Vehicle-shafts having solid body portions and tubular leading ends, sleeve-like anchors rigidly secured in the body portions, a rod detachably mounted in each anchor and extended forward in the tubular end of the shaft, each rod having a head at its outer end, a coil-spring surrounding each rod, and draft members having tubular ends to loosely embrace the springs and attached to the inner ends of the latter.

7. Vehicle-shafts having wooden body portions, and tubular metallic leading ends applied thereto, tug-leathers embracing the shafts at the joints, draft members within the tubular ends and extended through their open tips, and draft-springs interposed between the body portions of the shafts and the draft members, subjected to compressive strain by tension on said members.

8. Vehicle-shafts having tubular leading ends, springs mounted therein and held at their outer ends, and draft members within the tubular portions of the shafts, shaped to loosely embrace the springs and attached to the inner ends of the latter.

In testimony whereof I have signed my name to this specification in the presence of two subscribing witnesses.

WILBUR G. DAVIS.

Witnesses:
    EDITH M. STODDARD,
    FREDERICK L. EMERY.